United States Patent
Demiryurek et al.

(10) Patent No.: US 8,566,030 B1
(45) Date of Patent: Oct. 22, 2013

(54) EFFICIENT K-NEAREST NEIGHBOR SEARCH IN TIME-DEPENDENT SPATIAL NETWORKS

(75) Inventors: Ugur Demiryurek, Redondo Beach, CA (US); Cyrus Shahabi, Irvine, CA (US); Farnoush Banaei-Kashani, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/278,060

(22) Filed: Oct. 20, 2011

Related U.S. Application Data

(60) Provisional application No. 61/482,030, filed on May 3, 2011.

(51) Int. Cl.
*G08G 1/00* (2006.01)
(52) U.S. Cl.
USPC ........... 701/426; 701/409; 701/410; 701/411; 701/412; 701/423; 701/438; 701/450; 701/468
(58) Field of Classification Search
USPC ........... 701/25, 420–426, 434, 438, 450, 465, 701/458, 473
See application file for complete search history.

(56) References Cited

U.S. PATENT DOCUMENTS

| | | | | |
|---|---|---|---|---|
| 6,909,965 | B1* | 6/2005 | Beesley et al. | 701/533 |
| 2005/0288856 | A1* | 12/2005 | Uyeki et al. | 701/210 |
| 2006/0047421 | A1* | 3/2006 | Goldberg et al. | 701/209 |
| 2006/0170565 | A1* | 8/2006 | Husak et al. | 340/825.49 |
| 2007/0050603 | A1* | 3/2007 | Vorbach et al. | 712/221 |
| 2007/0206008 | A1* | 9/2007 | Kaufman et al. | 345/424 |
| 2007/0219711 | A1* | 9/2007 | Kaldewey et al. | 701/208 |
| 2007/0255707 | A1* | 11/2007 | Tresser et al. | 707/6 |
| 2008/0004789 | A1* | 1/2008 | Horvitz et al. | 701/117 |
| 2009/0043486 | A1* | 2/2009 | Yang et al. | 701/117 |
| 2010/0262359 | A1 | 10/2010 | Motoyama | |

FOREIGN PATENT DOCUMENTS

| | | |
|---|---|---|
| EP | 0833290 | 4/1998 |
| WO | WO2009092812 | 7/2009 |
| WO | WO2011004026 | 1/2011 |

OTHER PUBLICATIONS

Antonin Guttman. R-Trees: A Dynamic Index Structure for Spatial Searching. Proceedings of SIGMOD, pp. 47-57, Boston, MA, 1984.
Cho, Hyung-Ju and Chung, Chin-Wan. An efficient and scalable approach to CNN queries in a road network. Proceedings of VLDB, pp. 865-876, Trondheim, Norway, 2005.

(Continued)

*Primary Examiner* — Mary Cheung
*Assistant Examiner* — Atul Trivedi
(74) *Attorney, Agent, or Firm* — Fish & Richardson P.C.

(57) ABSTRACT

The class of k Nearest Neighbor (k NN) queries in spatial networks has been studied in the literature. Existing approaches for k NN search in spatial networks assume that the weight of each edge in the spatial network is constant. However, real-world edge-weights are time-dependent and vary significantly in short durations, hence invalidating the existing solutions. The problem of k NN search in time-dependent spatial networks, where the weight of each edge is a function of time, is addressed herein. Two indexing schemes (Tight Network Index and Loose Network Index) are proposed to minimize the number of candidate nearest neighbor objects and reduce the invocation of the expensive fastest-path computation in time-dependent spatial networks. We demonstrate the efficiency of our proposed solution via experimental evaluations with real-world data-sets, including a variety of large spatial networks with real traffic-data.

8 Claims, 13 Drawing Sheets

(56) References Cited

OTHER PUBLICATIONS

Demiryurek et al., "Towards K Nearest Neighbor Search in Time Dependent Spatial Network Databases," 2010, Proceedings of DNIS, 2010.
Dimitris Papadias and Jun Zhang and Nikos Mamoulis and Yufei Tao. Query processing in spatial networks. Proceedings of VLDB, pp. 802-813, Berlin, Germany, 2003.
Ding, Bolin and Yu, Jeffrey Xu and Qin, Lu. Finding time-dependent shortest paths over graphs. Proceedings of EDBT, New York, NY, USA, 2008. ACM.
Dreyfus, P. An appraisal of some shortest path algorithms. Journal of Operation Research 17, NY, USA, 1969.
George, Betsy and Kim, Sangho and Shekhar, Shashi. Spatio-temporal Network Databases and Routing Algorithms: A Summary of Results. Proceedings of SSTD, 2007.
Haibo Hu and Dik Lun Lee and Jianliang Xu. Fast Nearest Neighbor Search on Road Networks. Proceedings of EDBT, pp. 33-40, Toronto, Canada, 2006.
Hanan Samet and Jagan Sankaranarayanan and Houman Alborzi. Scalable Network Distance Browsing in Spatial Databases. Proceedings of SIGMOD, pp. 33-40, Toronto, Canada, 2008.
Huang, Xuegang and Jensen, Christian S. and Saltenis, Simonas. The Island Approach to Nearest Neighbor Querying in Spatial Networks. Proceedings of SSTD, pp. 33-40, Toronto, Canada, 2005.
Ismail Chabini. The Discrete-Time Dynamic Shortest Path Problem: Complexity, Algorithms, and Implementations. Journal of Transportation Research Record, 1645, NJ, USA, 1999.
J. Halpern. Shortest route with time dependent length of edges and limited delay possibilities in nodes. Journal of Mathematical Methods of Operations Research,21, 1969.
Kanoulas, Evangelos and Du, Yang and Xia, Tian and Zhang, Donghui. Finding Fastest Paths on A Road Network with Speed Patterns. Proceedings of ICDE, Washington, USA, 2006.
Martin Erwig and Fernuniversitat Hagen. The Graph Voronoi Diagram with Applications. Journal of Networks, 36, 2000.
Mohammad Kolandouzan and Cyrus Shahabi. Voronoi-based K NN search in spatial networks. Proceedings of VLBD, pp. 840-851, Toronto, Canada, 2004.
Navteq, Website Home Page, Navteq, 2010, 1 page.
Orda, Ariel and Rom, Raphael. Shortest-path and minimum-delay algorithms in networks with time-dependent edge-length. Journal of the ACM,37, 1990.
TeleAtlas. http://www.teleatlas.com. Last visited Jan. 2, 2010.
Tomtom, Digital Map Feedback, Home Page, downloaded from the internet at http://licensing.tomtom.com/ForConsumers/MapFeedback/index.htm, on May 2, 2011, 1 page.
Ugur Demiryurek and Bei Pan and Farnoush Banaei Kashani and Cyrus Shahabi. Towards modeling the traffic data on road networks. Proceedings of SIGSPATIAL-IWCTS, 2009.
Ulrith Lauther. An Extremely Fast, Exact Algorithm for Finding Shortest Paths in Static Networks with Geographical Background. Geoinformation and Mobilitat, pp. 33-40, Toronto, Canada, 2004.
Wagner, Dorothea and Willhalm,Thomas. Geometric Speed-Up Techniques for Finding Shortest Paths in Large Sparse Graphs. Proceedings of Algorithms—ESA, 2003.
R. Agrawal and V. H. Jagadish. Algorithms for searching massive graphs. *ICDE*, 1994.
Gernot Veit Batz and Daniel Delling and Peter Sanders and Christian Vetter. Time-Dependent Contraction Hierarchies. ALENEX, 2009.
Adrijana Car and Andrew U. Frank. Modelling a hierarchy of space applied to large road networks. IGIS, 1994.
L. Cooke and E. Halsey. The shortest route through a network with timedependent internodal transit times. Journal of Mathematical Analysis and Applications, NJ, USA, 1966.
Daniel Delling, Time-Dependent SHARC-Routing, ESA, 2008.
Dehne, Frank and Omran, Masoud T. and Sack, Jörg-Rüdiger. Shortest paths in time-dependent FIFO networks using edge load forecasts. IWCTS, 2009.
Daniel Delling and Dorothea Wagner. Landmark-based routing in dynamic graphs. WEA, 2007.
Delling, et al., "Time-Dependent Route Planning", Robust and Online Large-Scale Optimization, Oct. 21, 2009, pp. 207-230.
Ugur Demiryurek and Farnoush Banaei Kashani and Cyrus Shahabi. A Case for Time-dependent Shortest Path Computation in Spatial Networks. ACM SIGSPATIAL, Sep. 2010.
Ugur Demiryurek and Farnoush Banaei Kashani and Cyrus Shahabi. Efficient K-Nearest Neighbor Search in Time-Dependent Spatial Networks. DEXA, Aug. 2010.
Stuart E. Dreyfus. An Appraisal of Some Shortest-Path Algorithms. Operations Research vol. 17, No. 3, 1969.
Andrew V. Goldberg and Chris Harellson. Computing the Shortest Path: A* Search Meets Graph Theory. SODA, pp. 422-432, 2005.
Baris Guc and Anand Ranganathan. Real-time, Scalable Route Planning using Stream-Processing Infrastructure. ITS, NJ, USA, 2010.
Hart, Peter and Nilsson, Nils and Raphael, Bertram. A Formal Basis for the Heuristic Determination of Minimum Cost Paths. IEEE Transactions on Systems Science and Cybernetics, 1968.
Ekkehard Köhler and Katharina Langkau and Martin Skutella. Time-Expanded Graphs for Flow-Dependent Transit Times. Proc. 10th Annual European Symposium on Algorithms, 2002.
NAVTEQ,. http://www.navteq.com. Accessed in May 2010.
Ira Pohl. Bi-directional Search. Machine Intelligence,Edinburgh University Press, 1971.
Potamias, Michalis and Bonchi, Francesco and Castillo, Carlos and Gionis, Aristides. Fast shortest path distance estimation in large networks. CIKM, 2009.
Hanan Samet and Jagan Sankaranarayanan and Houman Alborzi. Scalable Network Distance Browsing in Spatial Databases. SIGMOD, pp. 33-40, Toronto, Canada, 2008.
P. Sanders and D. Schultes. Highway hierarchies hasten exact shortest path queries. ESA, 2005.
Sanders, Peter and Schultes, Dominik. Engineering fast route planning algorithms. WEA, 2007.
TELEATLAS. http://www.teleatlas.com. Accessed in May 2010.
Varaiya, Pravin, "What We've Learned about Highway Congestion", Access, No. 27, Fall 2005, pp. 1-8.
Wagner, Dorothea and Willhalm,Thomas. Geometric Speed-Up Techniques for Finding Shortest Paths in Large Sparse Graphs. *ESA*, 2003.
Otinjac, Adina-Gabriela, Authorized Officer, European Patent Office, PCT/US2012/036012, Aug. 9, 2012, 15 pages.

\* cited by examiner

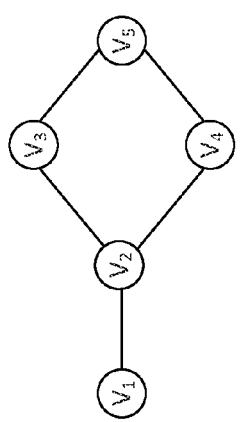
*Fig. 3A*
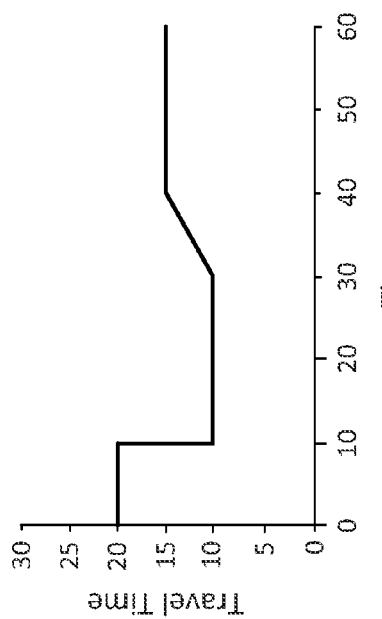
*Fig. 3B*
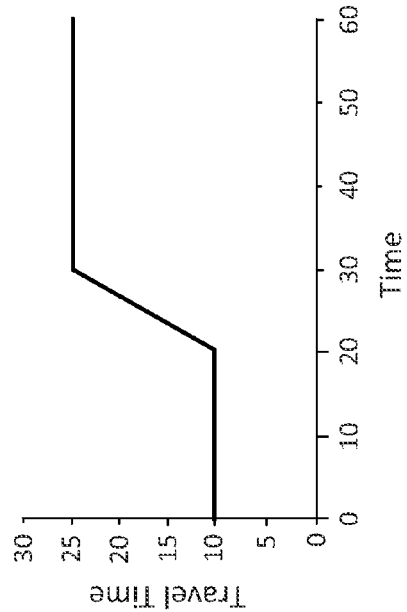
*Fig. 3D*
*Fig. 3C*

Algorithm 1 NN-Algorithm(q,TNI,LNI)

1: // q: location of the query object
2: // S: an array containing the candidate set
3: // H: a minimum heap, p: the first NN
4: Initialize S and H;
5: p ← containTNI(q);
6: if p is null then
7:    S ← containLNI(q);
8:    for each data object $s_i$ in S do
9:       computeTDFP($q,s_i$, t);
10:      insert $s_i$ to H;
11:   end for
12:   p ← deHeap H;
13: end if
14: return p;

*Fig. 8A*

Algorithm 2 kNN-Algorithm(TNI,LNI,q,k)

1: // N: an array of NN set
2: // H: a minimum heap, p: any NN, k: number of NN
3: Initialize H, N
4: p ← NN-Algorithm(q,TNI, LNI);
5: add p to N
6: while N.size ≤ k do
7:    for each neighbor $s_j$ of N do
8:       computeTDFP($q,s_j$, t)
9:      add $S_j$ to H;
10:   end for
11:   p ← deHeap H; // find next NN
12:   add p to N
13: end while
14: return N // return kNN

*Fig. 8B*

Algorithm 3 TDFP($G_T(V,E),q,d,t_s$)
1: // $q$: source, $d$:target, $t_v$:departure-time from node $v$,
2: //$cost(v)$:cost from $s$ to $v$, $pre(v)$:previous node in optimal path
3:   $Q \leftarrow$ set of nodes in $LC(q)$ and $LC(d)$
4:   $\forall v \in Q\ cost(v) = \infty$, $cost(q) = 0$
5: while $Q$ *is not empty* do
6:     $v_i \leftarrow$ node in Q with smallest cost
7:     *remove $v_i$ from Q*
8:     IF $v_i = d$ THEN return path
9:     *for each neighbor $v_j$ of $v_i$*
10:    $l(v_j)=cost(v_i) + h_{LC}(v_j) + TT(v_i,v_j,t_{vi})$
11:    IF $l(v_j) < cost(v_j)$ THEN
12:    $cost(v_j) = l(v_j)$
13:    $prev(v_3)=v_i$
14:    $t_{vj} = dt(v_i) + TT(v_i,v_j,t_{vi})$
15: end while

Fig. 11

| Parameters | Default | Range |
|---|---|---|
| Number of objects | 10 (K) | 1,5,10,15,20 (K) |
| Number of queries | 3 (K) | 1,2,3,4,5 (K) |
| Number of k | 20 | 1,10,20,30,40,50 |
| Object Distribution | Uniform | Uniform, Gaussian |
| Query Distribution | Uniform | Uniform, Gaussian |

Fig. 12

EFFICIENT K-NEAREST NEIGHBOR SEARCH IN TIME-DEPENDENT SPATIAL NETWORKS

CROSS REFERENCE TO RELATED APPLICATIONS

This application claims the benefit of priority from U.S. Provisional Application entitled "Efficient K-Nearest Neighbor Search in Time-dependent Spatial Networks", filed May 3, 2011, application Ser. No. 61/482,030, the disclosure of which is incorporated by reference in its entirety.

STATEMENT AS TO FEDERALLY SPONSORED RESEARCH

This invention was made with government support under grant number CNS-0831505 (CyberTrust) awarded by the National Science Foundation (NSF). The government has certain rights in the invention.

BACKGROUND

This specification relates to k Nearest Neighbor (k NN) queries in spatial networks.

Recent advances in online map services and their wide deployment in hand-held devices and car-navigation systems have led to extensive use of location-based services. The most popular class of such services is k-nearest neighbor (k NN) queries where users search for geographical points of interests (e.g., restaurants, hospitals) and the corresponding directions and travel-times to these locations. Accordingly, numerous algorithms have been developed (e.g., Hanan Samet and Jagan Sankaranarayanan and Houman Alborzi. Scalable Network Distance Browsing in Spatial Databases. *Proceedings of SIGMOD*, pages 33-40, Toronto, Canada, 2008; Mohammad Kolandouzan and Cyrus Shahabi. Voronoi-based K NN search in spatial networks. *Proceedings of VLDB*, pages 840-851, Toronto, Canada, 2004; Dimitris Papadias and Jun Zhang and Nikos Mamoulis and Yufei Tao. Query processing in spatial networks. *Proceedings of VLDB*, pages 802-813, Berlin, Germany, 2003; Cho, Hyung-Ju and Chung, Chin-Wan. An efficient and scalable approach to CNN queries in a road network. *Proceedings of VLDB*, pages 865-876, Trondheim, Norway, 2005; Huang, Xuegang and Jensen, Christian S. and Saltenis, Simonas. The Island Approach to Nearest Neighbor Querying in Spatial Networks. *Proceedings of SSTD*, pages 33-40, Toronto, Canada, 2005; Ulrith Lauther. An Extremely Fast, Exact Algorithm for Finding Shortest Paths in Static Networks with Geographical Background. *Geoinformation and Mobilitat*, pages 33-40, Toronto, Canada, 2004; and Wagner, Dorothea and Willhalm, Thomas. Geometric Speed-Up Techniques for Finding Shortest Paths in Large Sparse Graphs. *Proceedings of Algorithms-ESA*, 2003) to efficiently compute the distance and route between objects in large road networks.

SUMMARY

The majority of prior studies and existing commercial services makes the simplifying assumption that the cost of traveling each edge of the road network is constant (e.g., corresponding to the length of the edge) and rely on pre-computation of distances in the network. However, the actual travel-time on road networks heavily depends on the traffic congestion on the edges and hence is a function of the time of the day, i.e., travel-time is time-dependent. For example, FIG. 1 shows the real-world travel-time pattern on a segment of I-10 freeway in Los Angeles between 6AM and 8PM on a weekday. Two main observations can be made from this figure. First, the arrival-time to the segment entry determines the travel-time on that segment. Second, the change in travel-time is significant and continuous (not abrupt), for example from 8:30AM to 9:00AM, the travel-time of this segment changes from 30 minutes to 18 minutes (40% decrease). These observations have major computation implications: the fastest path from a source to a destination may vary significantly depending on the departure-time from the source, and hence, the result of spatial queries (including k NN) on such dynamic network heavily depends on the time at which the query is issued.

FIGS. 2A and 2B shows an example of time-dependent k NN search where an ambulance is looking for the nearest hospital (with least travel-time) at 8:30AM and 2PM on the same day on a particular road network. The time-dependent travel-time (in minutes) and the arrival time for each edge are shown on the edges. Note that the travel-times on an edge changes depending on the arrival time to the edge in FIGS. 2A and 2B. Hence, the query issued by the ambulance at 8:30AM and 2PM would return different results.

Meanwhile, an increasing number of navigation companies have started releasing their time-dependent travel-time information for road networks. For example, Navteq (http://www.navteq.com) and TeleAtlas (a wholly owned subsidiary of TomTom), which are leading providers of navigation services, offer traffic flow services that provide time-dependent travel-time (at the temporal granularity of as low as five minutes) of road network edges up to one year. The time-dependent travel-times are usually extracted from the historical traffic data and local information like weather, school schedules, and events. Based on Navteq's analysis, the time-dependent weight information improves the travel-time accuracy by an average of 41% when compared with typical speeds (time-independent) on freeways and surface streets. Considering the availability of time-dependent travel-time information for road networks on the one hand and the importance of time-dependency for accurate and realistic route planning on the other hand, it is essential to extend existing literature on spatial query processing and planning (such as k NN queries) in road networks to a new family of time-dependent query processing solutions.

Unfortunately, when considering time-dependent edge weights in road networks, the prior proposed k NN solutions that assume constant edge-weights and/or rely on distance precomputation generally fail. However, one can think of several new baseline solutions. Firstly, Dreyfus (An appraisal of some shortest path algorithms; Journal of Operation Research 17, NY, USA, 1969) has studied the relevant problem of time-dependent shortest path planning and showed that this problem can be solved by a trivially-modified variant of any label-setting (e.g., Dijkstra) static shortest path algorithm. Consequently, we can develop a primitive solution for the time-dependent k NN problem based on the incremental network expansion (hereinafter, "INE"; Dimitris Papadias and Jun Zhang and Nikos Mamoulis and Yufei Tao; Query processing in spatial networks; Proceedings of VLDB, pages 802-813, Berlin, Germany, 2003) approach where Dreyfus's modified Dijkstra algorithm is used for time-dependent distance calculation. With this approach, starting from a query object q all network nodes reachable from q are visited in order of their time-dependent travel-time proximity to q until all k nearest objects are located (i.e., blind network expansion). However, considering the prohibitively high overhead of executing blind network expansion particularly in large networks with a sparse (but perhaps large) set of data objects, this approach is far too slow to scale for real-time k NN query processing. Secondly, we can use time-expanded graphs (George, Betsy and Kim, Sangho and Shekhar, Shashi; Spatio-temporal Network Databases and Routing Algorithms: A Summary of Results; Proceedings of SSTD, 2007) to model the time-dependent networks. With time-expanded graphs the time domain is discretized and at each discrete time instant a snapshot of the network is used to represent the network. With this model, the time-dependent k NN problem is reduced to the problem of computing the minimum-weight paths through a series of static networks. Although this approach allows for exploiting the existing algorithms for k NN computation on static networks, it often fails to provide the correct results because the model misses the state of the network between any two discrete time instants.

Finally, with a third approach we can precompute time-dependent shortest paths between all possible sources and destinations in the network. However, shortest path precomputation on time-dependent road networks is challenging. Because, the shortest path on time-dependent networks (i.e., a network where edge weights are function of time) depends on the departure time from the source, and therefore, one needs to precompute all possible shortest paths for all possible departure-times. Of course, this is not a viable solution because the storage requirements for the precomputed paths would quickly exceed reasonable space limitations. With our prior work (Ugur Demiryurek and Farnoush Banaei Kashani and Cyrus Shahabi; Towards K-Nearest Neighbor Search in Time-Dependent Spatial Network Databases; Proceedings of DNIS, 2010), for the first time we introduced the problem of Time-Dependent k Nearest Neighbor (TD-k NN) search to find the k NN of a query object that is moving on a time-dependent network. With this work, we also investigated the first two baseline approaches discussed above by extensive experiments to rigorously characterize the inefficiency and inaccuracy of the two baseline solutions, respectively.

In this paper, we address the disadvantages of both baseline approaches by developing a novel technique that efficiently and accurately finds k NN of a query object in time-dependent road networks. A comprehensive solution for TD-k NN query should a) efficiently answer the queries in (near) real-time in order to support moving object k NN search on road networks, b) be independent of density and distribution of the data objects, and c) effectively handle the database updates where nodes, links, and data objects are added or removed. We address these challenges by developing two types of complementary index structures. The main idea behind these index structures is to localize the search space and minimize the costly time-dependent shortest path computation between the objects hence incurring low computation costs.

With our first index termed Tight Network Index (TNI), we can find the nearest objects without performing any shortest path computation. Our experiments show that in 70% of the cases the nearest neighbor can be found with this index. For those cases that the nearest objects cannot be identified by TNI, our second index termed Loose Network Index (LNI) allows us to filter in only a small number of objects that are potential candidates (and filter out the rest of the objects). Subsequently, we only need to perform the shortest path computation only for these candidates. As described further below, a TD-k NN algorithm has two phases. During the first phase (off-line), the spatial network is partitioned into sub-networks (cells) around the data objects by creating two cells for each data object called Tight Cell (TC) and Loose Cell (LC) and generate TNI and LNI on these cells, respectively. In the second phase (online), the TNI and LNI structures are used to immediately find the first nearest neighbor and then expand the search area to find the remaining k-1 neighbors.

In general, an aspect of the subject matter described in this specification can be embodied in a method that includes the actions of finding, by at least one computer system in response to a query having an associated location in a network of nodes and edges, a specified number of data objects of interest that are nearest to the location; wherein each of the edges has an associated time-dependent weight; and the finding includes filtering a set of candidate nearest neighbors based on sub-networks around the data objects of interest, the sub-networks including a sub-network generated by expanding from a corresponding one of the data objects using a lower-bound for edge weights between nodes, wherein the expansion of the sub-network was limited by other sub-networks expanded from remaining ones of the data objects using an upper-bound for edge weights between nodes. Other embodiments of this aspect include corresponding systems, apparatus, and computer program products.

These and other embodiments can optionally include one or more of the following features. The sub-networks around the data objects of interest can be first sub-networks, and the finding can include filtering out objects of the set of candidate nearest neighbors based on the first sub-networks, and filtering in objects of the set of candidate nearest neighbors based on the first sub-networks and second sub-networks around the data objects of interest, the second sub-networks including a second sub-network expanded from a corresponding one of the data objects using an upper-bound for edge weights between nodes, wherein the expansion of the second sub-network was limited by other sub-networks expanded from remaining ones of the data objects using a lower-bound for edge weights between nodes.

The network can include a graph model of a physical road network, and the edge weights can correspond to travel-times. The method can include partitioning the network to form the first sub-networks and the second sub-networks. The data objects of interest can include objects of a first type, the network can include data objects of a second type, which is different than the first type, the query can have an associated type of data object sought, and finding the specified number of the data objects can include finding only data objects that are of the type associated with the query. The finding can include: checking the second sub-networks for one second sub-network having the location inside it; and if the one second sub-network having the location inside it is found, identifying one data object corresponding to the one second sub-network as the nearest neighbor, else, identifying the nearest neighbor using the first sub-networks.

The specified number can be greater than one, and the method can include: determining a subset of the first sub-networks that are direct neighbors of a first sub-network corresponding to a last nearest neighbor identified; and identifying a next nearest neighbor using the subset of the first sub-networks by performing time-dependent fastest path computations that are bounded in accordance with the subset of the first sub-networks.

Identifying the nearest neighbor using the first sub-networks can include searching a spatial index structure generated on the first sub-networks to identify candidates, and performing time-dependent fastest path computations for the candidates; wherein determining the subset of the first sub-networks includes accessing first information stored in the spatial index structure at an entry corresponding to the last nearest neighbor identified, the first information indicating the direct neighbors; and wherein identifying the next nearest neighbor includes using second information stored in the spatial index structure at entries corresponding to the first sub-networks of the subset, the second information indicating network nodes inside the first sub-networks of the subset by which the time-dependent fastest path computations are bounded. In addition, the spatial index structure can be used to perform data object and edge weight updates.

According to another aspect of the subject matter described in this specification, a computer-readable medium encodes a computer program product operable to cause data processing apparatus of a location-based, geographical points of interest searching system, to perform operations including: partitioning a time-dependent spatial network into cells around the points of interest, the points of interest being associated with locations in the time-dependent spatial network, and the cells including a tight cell and a loose cell for each of the points of interest; and finding, in response to a query submitted to the searching system, the query having an associated location in the time-dependent spatial network, a specified number of the points of interest that are nearest to the location, using the tight cells and the loose cells.

The time-dependent spatial network can indicate time-dependent travel times corresponding to a road network serviced by the searching system, wherein the tight cell for a given point of interest is a first sub-network around the given point of interest where any location in the first sub-network is guaranteed to have the given point of interest as its nearest neighbor, and wherein the loose cell for the given point of interest is a second sub-network around the given point of interest where any location outside the second sub-network is guaranteed to not have the given point of interest as its nearest neighbor.

Partitioning the time-dependent spatial network can include, for each one of the points of interest: determining the tight cell for the one point of interest by expanding a first sub-network, within the time-dependent spatial network, starting from the one point of interest and using maximum travel-time between nodes, and limiting the expansion of the first sub-network by expanding other sub-networks, within the time-dependent spatial network, starting from other points of interest and using minimum travel-time between nodes; and determining the loose cell for the one point of interest by expanding a second sub-network, within the time-dependent spatial network, starting from the one point of interest and using minimum travel-time between nodes, and limiting the expansion of the second sub-network by expanding other sub-networks, within the time-dependent spatial network, starting from the other points of interest and using maximum travel-time between nodes.

The points of interest can be of a first type, the time-dependent spatial network can include points of interest of a second type, which is different than the first type, the query can have an associated type of point of interest sought, and finding the specified number of the points of interest can include finding only points of interest that are of the type associated with the query. The finding can include: checking the tight cells for one tight cell having the location inside it; and if the one tight cell having the location inside it is found, identifying one point of interest corresponding to the one tight cell as the nearest neighbor, else, identifying the nearest neighbor using the loose cells for the points of interest. The specified number can be greater than one, and the operations can include: determining a subset of the loose cells that are direct neighbors of a loose cell corresponding to a last nearest neighbor identified; and identifying a next nearest neighbor using the subset of the loose cells by performing time-dependent fastest path computations that are bounded in accordance with the subset of the loose cells.

Identifying the nearest neighbor using the loose cells can include searching a spatial index structure generated on the loose cells to identify candidates, and performing time-dependent fastest path computations for the candidates; wherein determining the subset of the loose cells includes accessing first information stored in the spatial index structure at an entry corresponding to the last nearest neighbor identified, the first information indicating the direct neighbors; and wherein identifying the next nearest neighbor includes using second information stored in the spatial index structure at entries corresponding to the loose cells of the subset, the second information indicating network nodes inside the loose cells of the subset by which the time-dependent fastest path computations are bounded. In addition, the searching system can be one that provides online map services.

According to another aspect of the subject matter described in this specification, a system includes: a user interface device; and one or more computers operable to interact with the user interface device, the one or more computers including at least one processor and at least one memory device, and the one or more computers configured and arranged to perform operations including partitioning a network of nodes and edges into sub-networks around data objects of interest within the network, wherein each of the edges has an associated time-dependent weight, and the partitioning including (i) expanding one of the sub-networks starting from a corresponding one of the data objects and using a lower-bound for edge weights between nodes, and (ii) limiting the expansion of the one sub-network by expanding other sub-networks starting from remaining ones of the data objects and using an upper-bound for edge weights between nodes; and the operations including finding, in response to a query having an associated location in the network, a specified number of the data objects of interest that are nearest to the location, using the sub-networks around the data objects.

The sub-networks around the data objects of interest can be first sub-networks, the partitioning can include partitioning the network into second sub-networks around the data objects of interest, including expanding one of the second sub-networks starting from a corresponding one of the data objects and using an upper-bound for edge weights between nodes, and limiting the expansion of the one second sub-network by expanding other sub-networks starting from remaining ones of the data objects and using a lower-bound for edge weights between nodes; and the finding can include finding the specified number of the data objects of interest using the first sub-networks and the second sub-networks.

The one or more computers can include means for indexing the first sub-networks and the second sub-networks to localize search space and minimize shortest path computation between the data objects of interest in the network. The one or more computers can include a server operable to interact with the user interface device through a data communication network, and the user interface device can be operable to interact with the server as a client. The user interface device can include a mobile phone. Moreover, the one or more computers can include one personal computer, and the personal computer can include the user interface device.

BRIEF DESCRIPTION OF THE DRAWINGS

FIGS. 3A-3F depict a road network modeled as a time-dependent graph $G_T(V,E)$.

FIGS. 8A and 8B show a time-dependent k nearest neighbor query answering process.

FIG. 11 shows a time-dependent label-setting algorithm.

FIG. 12 shows parameters used in several experiments conducted with different spatial networks to evaluate the performance of the time-dependent k nearest neighbor query answering process.

DETAILED DESCRIPTION

Figure 1:
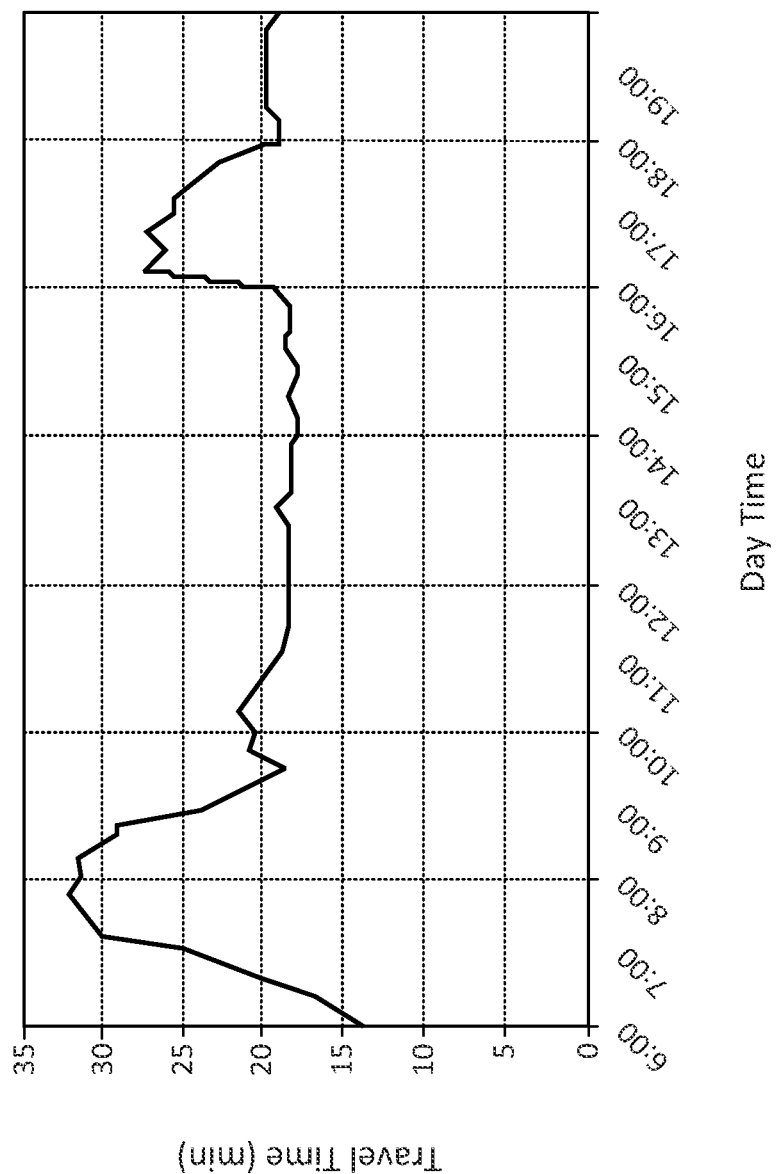
FIG. 1 shows the real-world travel-time pattern on a segment of I-10 freeway in Los Angeles between 6 AM and 8 PM on a weekday.
Figures 2A, 2B:
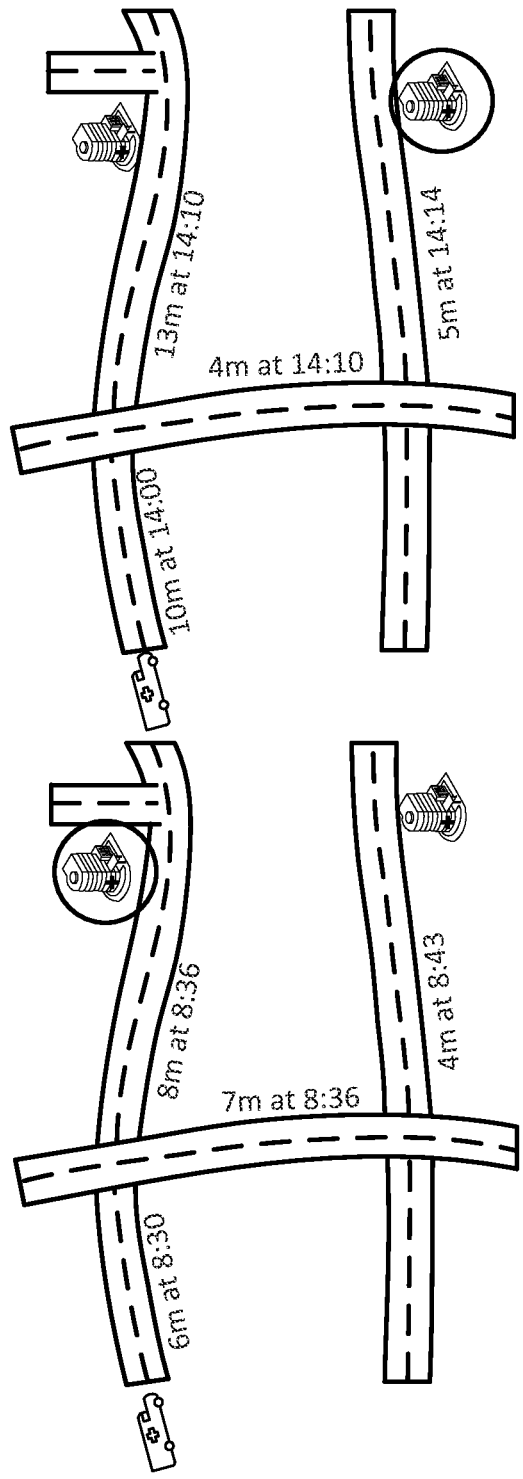
FIGS. 2A and 2B show an example of time-dependent k NN search where an ambulance is looking for the nearest hospital (with least travel-time) at 8:30AM and 2PM on the same day on a particular road network.

Section 1—Overview: This paper is organized as follows. In Section 2, we review the related work on both k NN and time-dependent shortest path studies. In Section 3, we formally define the TD-k NN query in spatial networks. In Section 4, we establish the theoretical foundation of our algorithms and explain our query processing technique. In Section 5, we present experimental results on variety of networks with actual time-dependent travel-times generated from real-world traffic data (collected for past 1.5 years). In Section 6, we conclude and discuss our future work.

Section 2—Related Work: In this section we review previous studies on k NN query processing in road networks as well as time-dependent shortest path computation.

Section 2.1—k NN Queries in Spatial Networks: In Query processing in spatial networks (Proceedings of VLDB, pages 802-813, Berlin, Germany, 2003), Papadias et al. introduced Incremental Network Expansion (INE) and Incremental Euclidean Restriction (IER) methods to support k NN queries in spatial networks. While INE is an adaption of the Dijkstra algorithm, IER exploits the Euclidean restriction principle in which the results are first computed in Euclidean space and then refined by using the network distance. In Voronoi-based K NN search in spatial networks (Proceedings of VLDB, pages 840-851, Toronto, Canada, 2004), Kolandouzan and Shahabi proposed first degree network Voronoi diagrams to partition the spatial network to network Voronoi polygons (NVP), one for each data object. They indexed the NVPs with a spatial access method to reduce the problem to a point location problem in Euclidean space. Cho et al., in An efficient and scalable approach to CNN queries in a road network (Proceedings of VLDB, pages 865-876, Trondheim, Norway, 2005), presented a system UNICONS where the main idea is to integrate the precomputed k NNs into the Dijkstra algorithm. Hu et al., in Fast Nearest Neighbor Search on Road Networks (Proceedings of EDBT, pages 33-40, Toronto, Canada, 2006), proposed a distance signature approach that precomputes the network distance between each data object and network vertex. The distance signatures are used to find a set of candidate results and Dijkstra is employed to compute their exact network distance. Huang et al. addressed the k NN problem using island approach in The Island Approach to Nearest Neighbor Querying in Spatial Networks (Proceedings of SSTD, pages 33-40, Toronto, Canada, 2005) where each vertex is associated to all the data points that are in radius r (so called islands) covering the vertex. With their approach, they utilized a restricted network expansion from the query point while using the precomputed islands. In Scalable Network Distance Browsing in Spatial Databases (Proceedings of SIGMOD, pages 33-40, Toronto, Canada, 2008), Samet et al. proposed a method where they associate a label to each edge that represents all nodes to which a shortest path starts with this particular edge. The labels are used to traverse shortest path quadtrees that enables geometric pruning to find the network distance. With all these studies, the edge weight functions are assumed to be constant and hence the shortest path computations and precomputations are no longer valid with time-varying edge weights. Unlike the previous approaches, we make a fundamentally different assumption that the weight of the network edges are time-dependent rather than fixed.

Section 2.2—Time-dependent Shortest Path Studies: Cooke and Halsey introduced, in The shortest route through a network with timedependent internodal transit times (Journal of Mathematical Analysis and Applications, NJ, USA, 1966), the first time-dependent shortest path (TDSP) solution where dynamic programming is used over a discretized network. In The Discrete-Time Dynamic Shortest Path Problem: Complexity, Algorithms, and Implementations (Journal of Transportation Research Record, 1645, NJ, USA, 1999), Chabini proposed a discrete time TDSP algorithm that allows waiting at network nodes. In Spatia-temporal Network Databases and Routing Algorithms: A Summary of Results (Proceedings of SSTD, 2007), George and Shekhar proposed a time-aggregated graph where they aggregate the travel-times of each edge over the time instants into a time series. All these studies assume the edge weight functions are defined over a finite discrete sequence of time steps $t \in t_0, t_1, \ldots, t_n$. However, discrete-time algorithms can have numerous shortcomings.

First, since the entire network is replicated for every specified time step, the discrete-time methods typically require an extensive amount of storage space for real-world scenarios where the spatial network is large. Second, these approaches can only provide approximate results since the computations are done on discrete-times rather than in continuous time. In An appraisal of some shortest path algorithms (Journal of Operation Research 17, NY, USA, 1969), Dreyfus proposed a generalization of Dijkstra algorithm, but his algorithm is showed (by Halpren in Shortest route with time dependent length of edges and limited delay possibilities in nodes; Journal of Mathematical Methods of Operations Research, 21, 1969) to be true only in FIFO networks. If the FIFO property does not hold in a time-dependent network, then the problem is NP-Hard as shown in Shortest-path and minimum-delay algorithms in networks with time-dependent edge-length (Journal of the ACM, 37, 1990), where Orda and Rom proposed a Bellman-Ford based solution where edge weights are piece-wise linear functions. In Finding time-dependent shortest paths over graphs (Proceedings of EDBT, New York, N.Y., USA, 2008), Ding et al. used a variation of label-setting algorithm which decouples the path-selection and time-refinement by scanning a sequence of time steps of which the size depends on the values of the arrival time functions. In Finding Fastest Paths on A Road Network with Speed Patterns (Proceedings of ICDE, Washington, USA, 2006), Kanoulas et al. introduced a Time-Interval All Fastest Path (allFP) algorithm in which they, instead of sorting the priority queue by scalar values, maintain a priority queue of all the paths to be expanded. Therefore, they enumerate all the paths from a source to a destination which yields exponential runtime in the worst case.

Section 3—Problem Definition: In this section, we formally define the problem of time-dependent k NN search in spatial networks. We assume a road network containing a set of data objects (i.e., points of interest such as restaurants, hospitals, etc.) as well as query objects searching for their k NN. We model the road network as a time-dependent weighted graph where the non-negative weights are time-dependent travel-times (i.e., positive piece-wise linear functions of time) between the nodes. We assume both data and query objects lie on the network edges and all relevant information about the objects is maintained by a central server.

Definition 1: A Time-dependent Graph ($G_T$) is defined as $G_T(V,E)$ where V and E represent set of nodes and edges, respectively. For every edge $e(v_i,v_j)$, there is a cost function $c_{(v_i,v_j)}(t)$ which specifies the cost of traveling from $v_i$ to $v_j$ at time t.

Figure 3E:
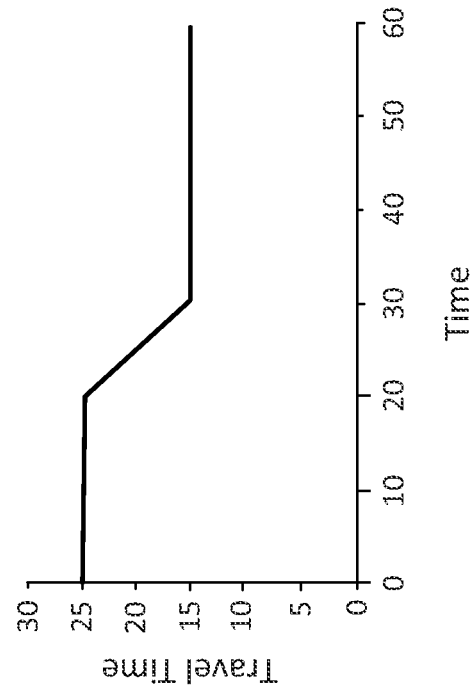
Figure 3F:
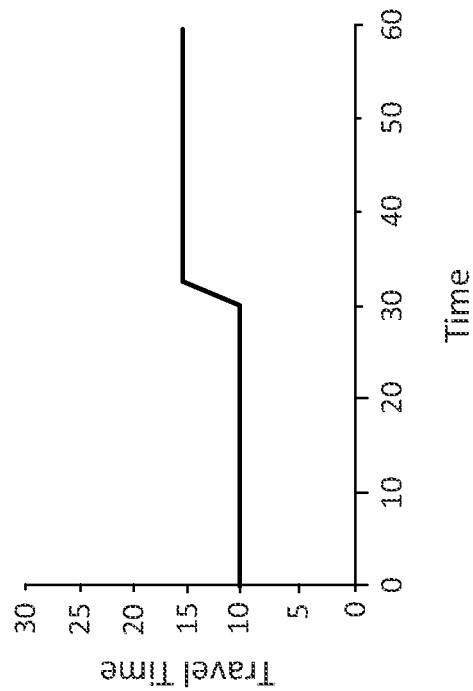

In FIG. 3A, a road network is modeled as a time-dependent graph $G_T(V,E)$. While FIG. 3A shows the graph structure, FIGS. 3B, 3C, 3D, 3E, and 3F illustrate the time-dependent edge costs, $c_{1,2}(t)$, $c_{2,3}(t)$, $c_{2,4}(t)$, $c_{4,5}(t)$, and $c_{3,5}(t)$, respectively, as piece-wise linear functions for the corresponding edges. For each edge, we define upper-bound ($\max(c_{v_i,v_j})$) and lower-bound ($\min(c_{v_i,v_j})$) time-independent costs. For example, in FIG. 3B, $\min(c_{v_1,v_2})$ and $\max(c_{v_1,v_2})$ of edge $e(v_1, v_2)$ are 10 and 20, respectively.

Definition 2: Let $\{s=v_1,v_2, \ldots, v_k=d\}$ represent a path which contains a sequence of nodes where $e(v_i,v_{i-1}) \in E$ and $i=1, \ldots, k-1$. Given a $G_T$, a path (s⤳d) from source s to destination d, and a departure-time at the source $t_s$, the time-dependent travel time TT(s⤳d,$t_s$) is the time it takes to travel along the path. Since the travel-time of an edge varies depending on the arrival-time to that edge (i.e., arrival dependency), the travel time is computed as follows:

$$TT(s \leadsto d, t_s) = \Sigma_{i=1}^{k-1} c_{(v_i, v_{i+1})}(t_i) \text{ where } t_1 = t_s, t_{i+1} = t_i + c_{(v_i, v_{i+1})}(t_i), i=1, \ldots, k \quad (1)$$

The upper-bound travel-time ITT(s⤳d) and the lower-bound travel time LTT(s⤳d) are defined as the maximum and minimum possible times to travel along the path, respectively. The upper and lower bound travel time are computed as follows, $$UTT(s \leadsto d) = \Sigma_{i=1}^{k-1} \max(c_{v_i, v_{i+1}}),$$
$$LTT(s \leadsto d) = \Sigma_{i=1}^{k-1} \min(c_{v_i, v_{i+1}}), i=1, \ldots, k. \quad (2)$$

To illustrate the above definitions in FIG. 3A, consider $t_s=5$ and path $(v_1,v_2,v_3,v_5)$ where $TT(v_1 \leadsto v_5,5)=45$, $UTT(v_1 \leadsto v_5)=65$, and $LTT(v_1 \leadsto v_5)=35$.

Note that we do not need to consider arrival-dependency when computing UTT and LTT hence; t is not included in their definitions. Given the definitions of TT, UTT and LTT, the following property holds for any path in $G_T$: $LTT(s \leadsto d) \leq TT(s \leadsto d, t_s) \leq UTT(s \leadsto d)$. This property is used in subsequent sections to establish some properties of the algorithm.

Definition 3: Given a $G_T$, s, d, and $t_s$, the time-dependent shortest path TDSP(s,d,$t_s$) is a path with the minimum travel-time among all paths from s to d. Since the travel-time between nodes can be considered the distance measure, we refer to TDSP(s,d,$t_s$) as time-dependent fastest path, TDFP(s,d,$t_s$), and use them interchangeably in the rest of the paper.

In a $G_T$, the fastest path from s to d is based on the departure-time from s. For instance, in FIG. 3A, suppose a query is looking for the fastest path from $v_1$ to $v_5$ at $t_s=5$. Then, TDFP $(v_1,v_5,5)=\{v_1,v_2,v_3,v_5\}$. However, the same query at $t_s=10$ returns TDFP$(v_1,v_5,10)=\{v_1,v_2,v_4,v_5\}$. As is apparent, with constant edge weights (i.e., time-independent), the query would always return the same path as a result.

Definition 4: A time-dependent k nearest neighbor query (TD-kNN) is defined as a query that finds the k nearest neighbors of a query object which is moving on a time-dependent network $G_T$. Considering a set of n data objects $P=\{p_1, p_2, \ldots, p_n\}$, the TD-k NN query with respect to a query point q finds a subset $P' \subset P$ of k objects with minimum time-dependent travel-time to q, i.e., for any object $p' \in P'$ and $p \in P-P'$, TDFP(q,p',t)$\leq$TDFP(q,p,t).

Note that it can be assumed that $G_T$ satisfies the First-In-First-Out (FIFO) property. This property suggests that moving objects exit from an edge in the same order they entered the edge. In practice, many networks, particularly transportation networks, exhibit FIFO property. Moreover, it can also be assumed that objects do not wait at a node, because, in most real-world applications, waiting at a node is not realistic as it requires the moving object to exit from the route and find a place to park and wait.

Section 4—TD-KNN: In this section, we explain an example of a TD-k NN algorithm according to the present invention. TD-k NN involves two phases: an off-line spatial network indexing phase and an on-line query processing phase. During the off-line phase, the spatial network is partitioned into Tight Cells (TC) and Loose Cells (LC) for each data object p and two complementary indexing schemes Tight Network Index (TNI) and Loose Network Index (LNI) are constructed. The main idea behind partitioning the network to TCs and LCs is to localize the k NN search and minimize the costly time-dependent shortest path computation. These index structures enable efficient finding of the data object (i.e., generator of a tight or loose cell) that is in shortest time-dependent distance to the query object, q. During the on-line phase, TD-k NN finds the first nearest neighbor of q by utilizing the TNI and LNI constructed in the off-line phase. Once the first nearest neighbor is found, TD-k NN expands the search area by including the neighbors of the nearest neighbor to find the remaining k−1 data objects. In the following sections, we first introduce some proposed index structures and then describe online query processing algorithm that utilizes these index structures.

Section 4.1—Indexing Time-Dependent Network (Off-line): In this section, we explain the main idea behind tight and loose cells as well as the construction of tight and loose network index structures.

Figure 4:
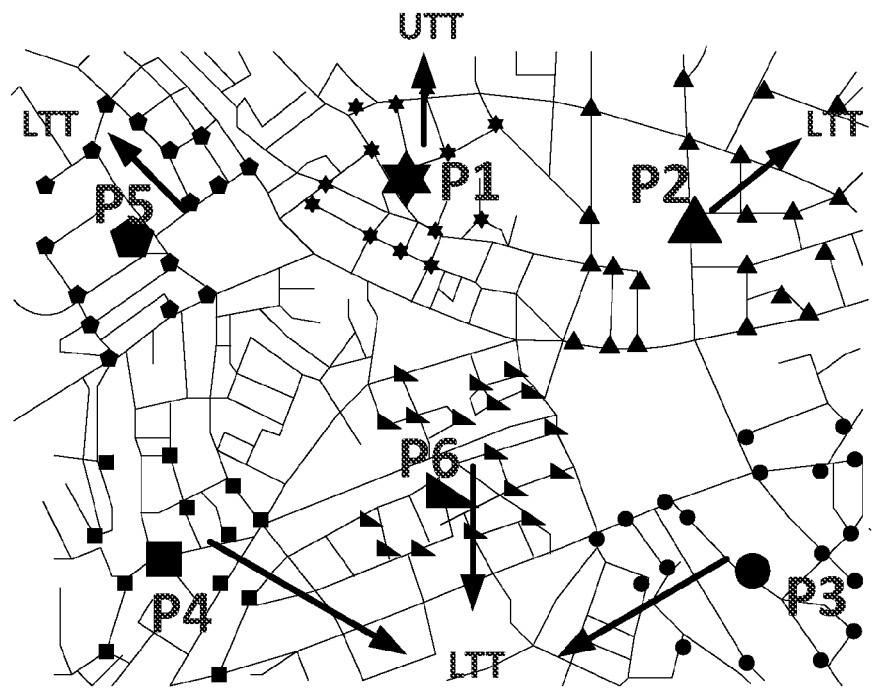
FIG. 4 depicts the network expansion from the data objects during the tight cell construction for $p_1$.
Figure 5:
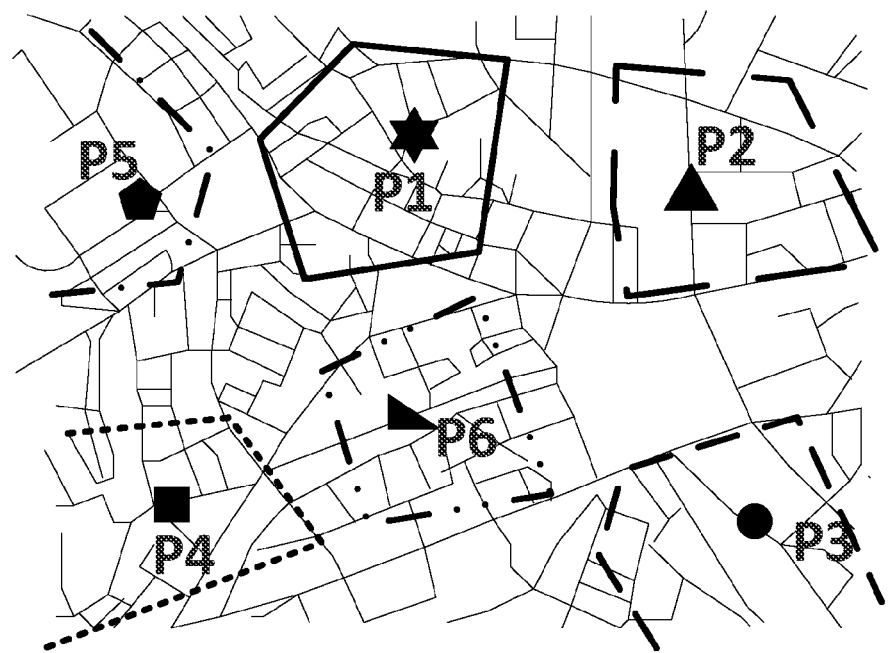
FIG. 5 shows the tight cell of each data object with a polygon (using a different line pattern for each tight cell's polygon).

Tight Network Index (TNI: The tight cell TC($p_i$) is a sub-network around $p_i$ in which any query object is guaranteed to have $p_i$ as its nearest neighbor in a time-dependent network. We compute tight cell of a data object by using parallel Dijkstra algorithm that grows shortest path trees from each data object. Specifically, we expand from $p_i$ (i.e., the generator of the tight cell) assuming maximum travel-time between the nodes of the network (i.e., UTT), while in parallel we expand from each and every other data object assuming minimum travel-time between the nodes (i.e., LTT). We stop the expansions when the shortest path trees meet. The main rationale is that if the upper bound travel-time between a query object q and a particular data object $p_i$ is less than the lower bound travel-times from q to any other data object, then $p_i$ is the nearest neighbor of q in a time-dependent network. We repeat the same process for each data object to compute its tight cell. FIG. 4 depicts the network expansion from the data objects during the tight cell construction for $p_i$. For the sake of clarity, we represent the tight cell of each data object with a polygon as shown in FIG. 5. We generate the edges of the polygons by connecting the adjacent border nodes (i.e., nodes where the shortest path trees meet) of a generator to each other. Lemma 1 proves the property of TC:

Lemma 1: Let P be a set of data objects $P=\{p_1, p_2, \ldots, p_n\}$ in $G_T$ and $TC(p_i)$ be the tight cell of a data object $p_i$. For any query point $q \in TC(p_i)$, the nearest neighbor of q is $p_i$, i.e., $\{\forall p_i \in P, p_j \neq p_i, TDFP(q,p_i,t) < TDFP(q,p_j,t)\}$.

Proof. We prove the lemma by contradiction. Assume that $p_i$ is not the nearest neighbor of the query object q. Then there exists a data object $p_j$ ($p_i \neq p_j$) which is closer to q; i.e., $TDFP(q,p_j,t) < TDFP(q,p_i,t)$. Let us now consider a point b (where the shortest path trees of $p_i$ and $p_j$ meet) on the boundary of the tight cell $TC(p_i)$. We denote shortest upper-bound path from $p_i$ to b (i.e., the shortest path among all $UTT(p_i \rightsquigarrow b)$ paths) as $D_{UTT}(p_i,b)$, and similarly, we denote shortest lower-bound path from $p_j$ to b (i.e., the shortest path among all $LTT(p_j \rightsquigarrow b)$ paths) as $D_{LTT}(p_j,b)$. Then, we have $TDFP(q,p_i,t) < D_{UTT}(p_i,b) = D_{LTT}(p_j,b) < TDFP(q,p_j,t)$. This is a contradiction; hence, $TDFP(q,p_i,t) < TDFP(q,p_j,t)$.

As described in Section 4.2, if a query point, q, is inside a specific TC, one can immediately identify the generator of that TC as the nearest neighbor for q. This stage can be expedited by using a spatial index structure generated on the TCs. Although TCs are constructed based on the network distance metric, each TC is actually a polygon in Euclidean space. Therefore, TCs can be indexed using spatial index structures (e.g., R-tree as in Antonin Guttman; R-Trees: A Dynamic Index Structure for Spatial Searching; Proceedings of SIGMOD, pages 47-57, Boston, Mass., 1984). This way a function (i.e., contain(q)) invoked on the spatial index structure would efficiently return the TC whose generator has the minimum time-dependent network distance to q. We formally define Tight Network Index as follows.

Definition 5: Let P be the set of data objects $P=\{p_1, p_2, \ldots, p_n\}$, the Tight Network Index is a spatial index structure generated on $\{TC(p_1), TC(p_2), \ldots, TC(p_n)\}$.

As illustrated in FIG. 5, the set of tight cells often does not cover the entire network. For the cases where q is located in an area which is not covered by any tight cell, we utilize the Loose Network Index (LNI) to identify the candidate nearest data objects. Next, we describe LNI.

Loose Network Index (LNI): The loose cell $LC(p_i)$ is a sub-network around $p_i$ outside which any point is guaranteed not to have $p_i$ as its nearest neighbor. In other words, data object $p_i$ is guaranteed not to be the nearest neighbor of q if q is outside of the loose cell of $p_i$. Similar to the construction process for $TC(p_i)$, we use the parallel shortest path tree expansion to construct $LC(p_i)$. However, this time, we use minimum travel-time between the nodes of the network (i.e., LTT) to expand from $p_i$ (i.e., the generator of the loose cell) and maximum travel-time (i.e., UTT) to expand from every other data object. Lemma 2 proves the property of LC:

Lemma 2: Let P be a set of data objects $P=\{p_1, p_2, \ldots, p_n\}$ in $G_T$ and $LC(p_i)$ be the loose cell of a data object $p_i$. If q is outside of $LC(p_i)$, $p_i$ is guaranteed not to be the nearest neighbor of q, i.e., $\{\forall q \notin LC(p_i), \exists p_j \in P, p_j \neq p_i, TDFP(q,p_i,t) > TDFP(q,p_j,t)\}$.

Proof. We prove by contradiction. Assume that $p_i$ is the nearest neighbor of a q, even though the q is outside of $LC(p_i)$; i.e., $TDFP(q,p_i,t) < TDFP(q,p_j,t)$. Suppose there exists a data object $p_j$ whose loose cell $LC(p_j)$ covers q (such a data object must exist, because as we will next prove by Lemma 3, the set of loose cells cover the entire network). Let b be a point on the boundary of $LC(p_i)$. Then, we have, $TDFP(q,p_i,t) < D_{UTT}(p_j,b) = D_{LTT}(p_i,b) < TDFP(q,p_j,t)$. This is a contradiction; hence, $p_i$ cannot be the nearest neighbor of q.

Figure 6:
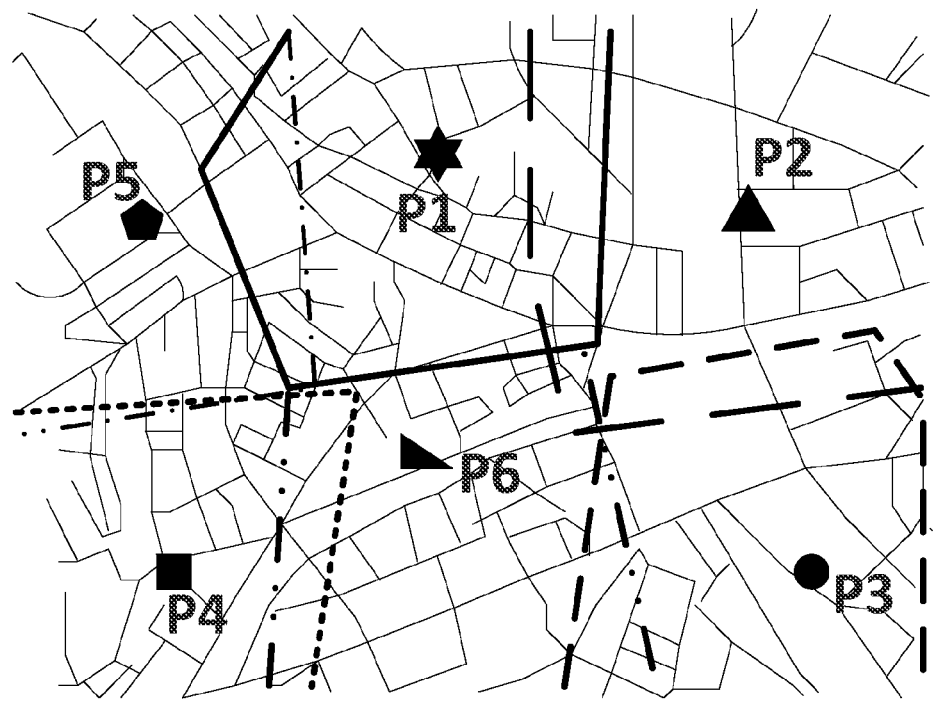
FIG. 6 shows the loose cells, which unlike tight cells, collectively cover the entire network and have some overlapping regions among each other.

As illustrated in FIG. 6, loose cells, unlike TCs, collectively cover the entire network and have some overlapping regions among each other.

Lemma 3: Loose cells may overlap, and they collectively cover the network.

Proof. As we mentioned, during loose cell construction, LTT is used for expansion from the generator of the loose cell. Since the parallel Dijkstra algorithm traverses every node until the priority queue is empty as described in The Graph Voronoi Diagram with Applications (Journal of Networks, 36, 2000), every node in the network is visited; hence, the network is covered. Since the process of expansion with LTT is repeated for each data object, in the overall process some nodes are visited more than once; hence, the overlapping areas. Therefore, loose cells cover the entire network and may have overlapping areas. Note that if the edge weights are constant, the LCs would not overlap, and TCs cells and LCs would be the same.

Based on the properties of tight and loose cells, we know that loose cells and tight cells have common edges (i.e., all the tight cell edges are also the edges of loose cells). We refer to data objects that share common edges as direct neighbors and remark that loose cells of the direct neighbors always overlap. For example, consider FIG. 6 where the direct neighbors of $p_2$ are $p_1$, $p_3$, and $p_6$. This property is especially useful for processing k−1 neighbors (see Section 4.2) after finding the first nearest neighbor. We determine the direct neighbors during the generation of the loose cells and store the neighborhood information in a data component. Therefore, finding the neighboring cells does not require any complex operation.

Similar to TNI, we can use spatial index structures to access loose cells efficiently. We formally define the Loose Network Index (LNI) as follows.

Definition 6: Let P be the set of data objects $P=\{p_1, p_2, \ldots, p_n\}$, the Loose Network Index is a spatial index structure generated on $\{LC(p_1), LC(p_2), \ldots, LC(p_n)\}$.

Note that LNI and TNI are complementary index structures. Specifically, if a q cannot be located with TNI (i.e., q falls outside of any TC), then we use LNI to identify the LCs that contain q; based on Lemma 2, the generators of such LCs are the only NN candidates for q.

Figure 7:
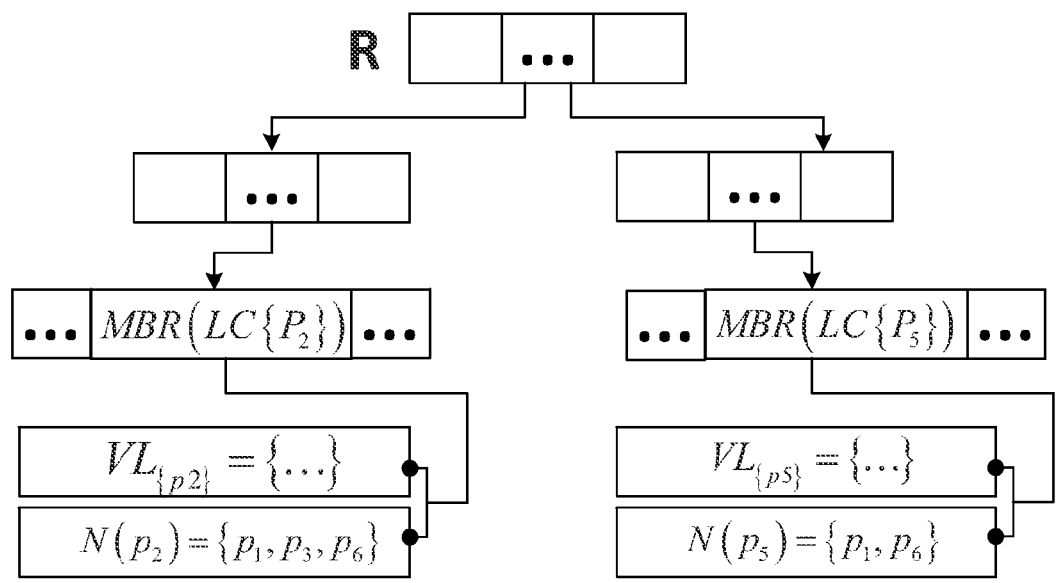
FIG. 7 depicts a loose node R-tree.

Various data structures and update techniques can be employed. In some implementations, an R-Tree like data structure can be used to implement TNI and LNI, termed TN R-tree and LN R-tree, respectively. FIG. 7 depicts LN R-tree (TN R-tree is a similar data structure without extra pointers at the leaf nodes, hence not discussed in detail). As shown, LN R-tree has the basic structure of an R-tree generated on minimum bounding rectangles of loose cells. The difference is that we modify R-tree by linking its leaf nodes to the the pointers of additional components that facilitate TD-kNN query processing. These components are the direct neighbors ($N(p_i)$) of $p_i$ and the list of nodes ($VL_{p_i}$) that are inside $LC(p_i)$. While $N(p_i)$ is used to filter the set of candidate nearest neighbors where k>1, we use $VL_{p_i}$ to prune the search space during TDSP computation (see Section 4.2).

These proposed index structures will need to be updated when the set of data objects and/or the travel-time profiles change. Fortunately, due to local precomputation nature of TD-kNN, the affect of the updates with both cases are local, hence requiring minimal change in tight and loose cell index structures. Below, we explain each update type.

Data Object Updates: We consider two types of object update; insertion and deletion (object relocation is performed by a deletion following by insertion at the new location). With a location update of a data object $p_i$, only the tight and loose cells of $p_i$'s neighbors are updated locally. In particular, when a new $p_i$ is inserted, first we find the loose cell(s) $LC(p_j)$ containing $p_i$. Clearly, we need to shrink $LC(p_j)$ and since the loose cells and tight cells share common edges, the region that contains $LC(p_j)$ and $LC(p_j)$'s direct neighbors needs to be adjusted. Towards that end, we find the neighbors of $LC(p_j)$; the tight and loose cells of these direct neighbors are the only ones affected by the insertion. Finally, we compute the new TCs and LCs for $p_i$, $p_j$ and $p_j$'s direct neighbors by updating our index structures. Deletion of a $p_i$ is similar and hence not discussed.

Edge Travel-time Updates: With travel-time updates, we do not need to update our index structures. This is because the tight and loose cells are generated based on the minimum (LTT) and maximum (UTT) travel-times of the edges in the network that are time-independent. The only case we need to update our index structures is when minimum and/or maximum travel-time of an edge changes, which is not that frequent. Moreover, similar to the data object updates, the affect of the travel-time profile update is local. When the maximum and/or minimum travel-time of an edge $e_i$ changes in the network, we first find the loose cell(s) $LC(p_j)$ that overlaps with $e_i$ and thereafter recompute the tight and loose cells of $LC(p_j)$ and its direct neighbors.

Section 4.2—TD-k NN Query Processing (Online): The properties of TNI and LNI are defined above. The description below provides details regarding how these index structures can be used to process k NN queries in $G_T$. Below, we first describe an algorithm to find the nearest neighbor (i.e., k=1), and then we extend it to address the k NN case (i.e., k≥1).

Nearest Neighbor Query: use TNI and LNI to identify the nearest neighbor of a query object q. Given the location of q, carry out a depth-first search from the TNI root to the node that contains q (Line 5 of Algorithm 1, shown in FIG. 8A). If a tight cell that contains q is located, return the generator of that tight cell as the first NN. Experiments show that, in most cases (7 out of 10), q can be found with the TNI search (see Section 5.2). If q cannot be located in TNI (i.e., when q falls outside all tight cells), proceed to search LNI (Line 7). At this step, one or more loose cells that contain q are found. Based on Lemma 2, the generators of these loose cells are the only possible candidates to be the NN for q. Therefore, compute TDFP to find the distance between q and each candidate in order to determine the first NN (Line 8-12). The candidates can be stored in a minimum heap based on their travel-time to q (Line 10), and the nearest neighbor cab be retrieved from the heap (Line 12).

k NN Query—The following algorithm for finding the remaining k−1 NNs is based on the direct neighbor property discussed in Section 4.1. The second NN must be among the direct neighbors of the first NN. Thus, once the second NN is identifeid, we continue by including the neighbors of the second NN to find the third NN and so on. This search algorithm is based on the following Lemma which is derived from the properties of TNI and LNI.

Lemma 4: The i-th nearest neighbor of q is always among the neighbors of the i−1 nearest neighbors of q.

Figure 9:
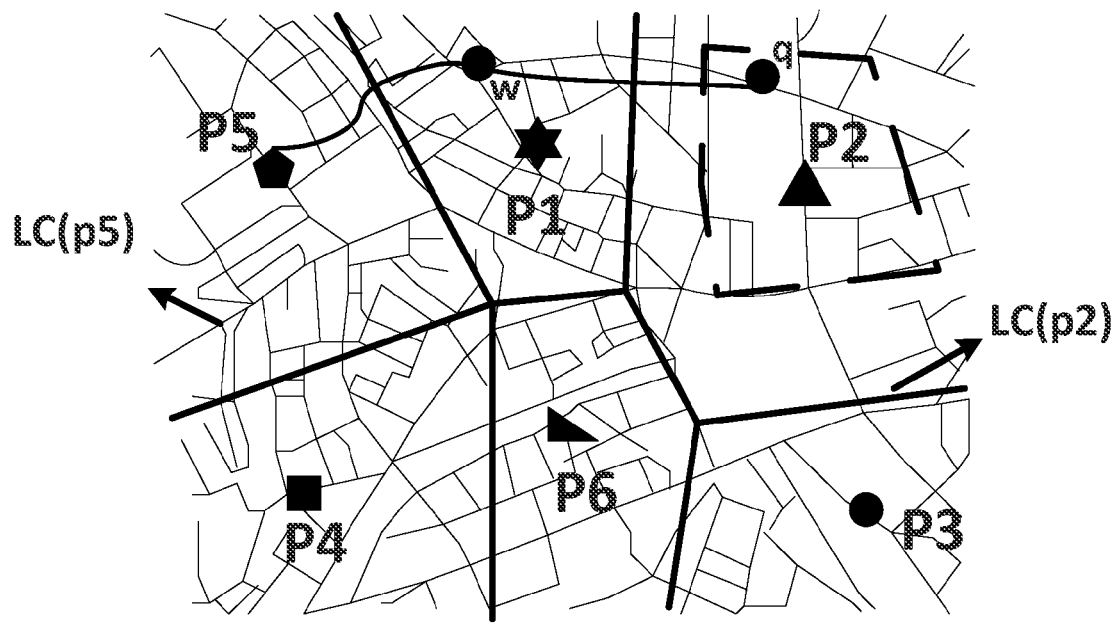
FIG. 9 shows a tight cell and loose cells in the network, where $p_2$ is the first nearest neigbor of q.

Proof. We prove this lemma by induction. We prove the base case (i.e., the second NN is a direct neighbor of the first NN of q) by contradiction. Consider FIG. 9 where $p_2$ is the first NN of q. Assume that $p_5$ (which is not a direct neighbor of $p_2$) is the second NN of q. Since $p_2$ and $p_5$ are not direct neighbors, a point w on the time-dependent shortest path between q and $p_5$ can be found that is outside both $LC(p_2)$ and $LC(p_5)$, However, $p_5$ cannot be a candidate NN for w, because w is not in $LC(p_5)$. Thus, there exists another object such as $p_1$ which is closer to w as compared to $p_5$. Therefore, TDFP(w, $p_5$,t)>TDFP(w,$p_1$,t). However, as shown in FIG. 9, we have TDFP(q,$p_5$,t)=TDFP(q,w,t)+TDFP(w,$p_5$,t)>TDFP(q,w,t)+ TDFP(w,$p_1$,t)=TDFP(q,$p_1$,t). Thus, $p_5$ is farther from q than both $p_2$ and $p_1$, which contradicts the assumption that $p_5$ is the second NN of q. The proof of inductive step is straight forward and similar to the above proof by contradiction; thus, the details are inherent in the disclosure already provided, and further details are not explicity presented here.

The complete TD-k NN query answering process is given in Algorithm 2 (shown in FIG. 8B). Algorithm 2 calls Algorithm 1 to find the first NN and add it to N, which maintains the current set of nearest neighbors (Lines 4-5). To find the remaining k−1 NNs, expand the search area by including the neighboring loose cells of the first NN. Compute the TDSP for each candidate and add each candidate to a minimum heap (Lines 9) based on its time-dependent travel-time to q. Thereafter, select the one with minimum distance as the second NN (Line 11). Once the second NN is identified, continue by investigating the neighbor loose cells of the second NN to find the third NN and so on. Experiments show that the average number of neighbors for a data object is a relatively small number less than 9 (see Section 5.2).

Time-dependent Fastest Path Computation: As explained, once the nearest neighbor of q is found and the candidate set is determined, the time-dependent fastest path from q to all candidates is computed in order to find the next NN. Before further details of an example of the TDFP computation are provided, a very useful property of loose cells should be noted. That is, given $p_i$ is the nearest neighbor of q, the time-dependent shortest path from q to $p_i$ is guaranteed to be in $LC(p_i)$ (see Lemma 5). This property indicates that one only need consider the edges contained in the loose cell of $p_i$ when computing TDFP from q to $p_i$. This property allows one to localize the time-dependent shortest path search by extensively pruning the search space. Since the localized area of a loose cell is substantially smaller as compared to the complete graph, the computation cost of TDFP is significantly reduced. Note that the subnetwork bounded by a loose cell is on average 1/n of the original network where n is the total number of sites.

Lemma 5: If $p_i$ is the nearest neighbor of q, then the time-dependent shortest path from q to $p_i$ is guaranteed to be inside the loose cell of $p_i$ Proof. We prove by contradiction. Assume that $p_i$ is the NN of q but a portion of TDFP from q to $p_i$ passes outside of $LC(p_i)$. Suppose a point l on that outside portion of the path. Since l is outside $LC(p_i)$, then $\exists p_j \in P$, $p_j \neq p_i$ that satisfies $D_{LTT}(p_i,l)>D_{UTT}(p_j,l)$ and hence TDFP($p_i$,l,t)>TDFP($p_j$,l,t). Then, TDFP($p_i$,q,t)=TDFP($p_i$,l,t)+TDFP(l,q,t)>TDFP($p_j$,l,t)+ TDFP(l,q,t)=TDFP($p_j$,q,t), which contradicts the fact that $p_i$ is the NN of q.

Figure 10:
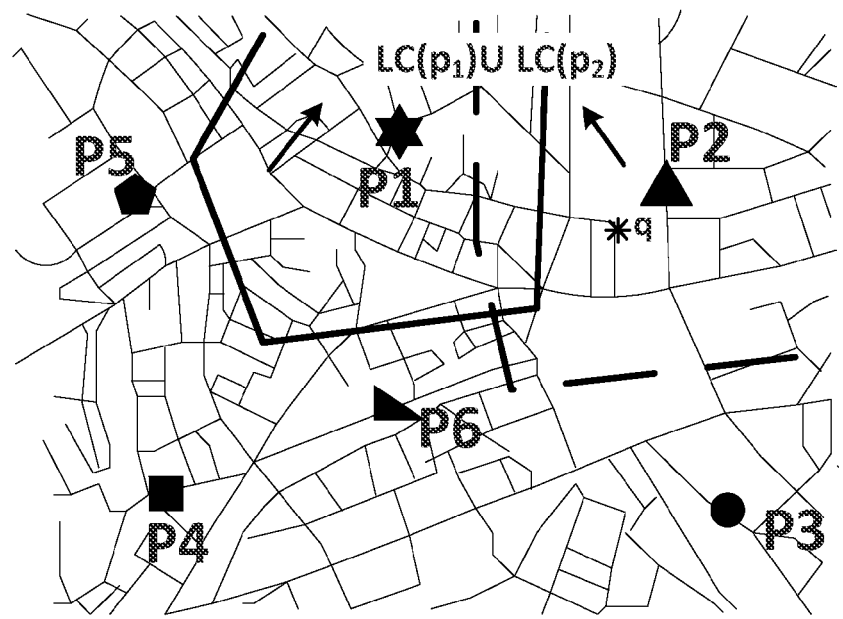
FIG. 10 shows an example query with k>1, where $p_2$ is assumed to be the nearest neighbor (and the candidate neighbors of $p_2$ are, $p_1$, $p_6$ and $p_3$).

We note that for TD-kNN with k>1, the TDFP from q to the kth nearest neighbor will lie in the combined area of neighboring cells. FIG. 10 shows an example of a query with k>1, where $p_2$ is assumed to be the nearest neighbor (and the candidate neighbors of $p_2$ are, $p_1$, $p_6$ and $p_3$). To compute the TDFP from q to data object $p_1$, one need only consider the edges contained in $LC(p_1) \cup LC(p_2)$. Below, the details of how to compute the TDFP from q to each candidate, according to some implementations, are provided.

As initially showed by Dreyfus in An appraisal of some shortest path algorithms (Journal of Operation Research 17, NY, USA, 1969), the TDFP problem (in FIFO networks) can be solved by modifying any label-setting or label-correcting static shortest path algorithm. The asymptotic running times of these modified algorithms are same as those of their static counterparts. With our approach, we implement a time-dependent A* search (a label-setting algorithm) to compute TDFP between q and the candidate set. The main idea with A* algorithm is to employ a heuristic function h(v) (i.e., lower-bound estimator between the intermediate node $v_i$ and the target t) that directs the search towards the target and significantly reduces the number of nodes that have to be traversed. With static road networks where the length of an edge is considered as the cost, the Euclidean distance between $v_i$ and t is the lower-bound estimator. However, with time-dependent road networks, we propose an estimator that never overestimates the travel-time between $v_i$ and t for all possible departure-times (from $v_i$). One simple lower-bound is $d_{euc}(v_i, t)/\max(\text{speed})$, i.e., the Euclidean distance between $v_i$ and t divided by the maximum speed among the edges in the entire network. Although this estimator is guaranteed to be a lower-bound between $v_i$ and t, it is a very loose bound, hence yields insignificant pruning. Fortunately, our approach can use Lemma 5 to obtain a much tighter lower-bound. Since the shortest path from q to $p_i$ is guaranteed to be inside $LC(p_i)$, we can use the maximum speed in $LC(p_i)$ to compute the lower-bound. We outline our time-dependent A* algorithm in Algorithm 3 (shown in FIG. 11) where essential modifications (as compared to Dreyfus, P.; An appraisal of some shortest path algorithms; Journal of Operation Research 17, NY, USA, 1969) are in Lines 3, 10 and 14. As mentioned, to compute TDFP from q to candidate $p_i$, one need only consider the nodes in the loose cell that contains q and $LC(p_i)$ (Line 3). To compute the labels for each node, arrival time and the estimator are used (i.e., cos $t(v_i)+h_{LC}(v_i)$ where $h_{LC}(v_i)$ is the lower-bound estimator calculated based on the maximum speed in the loose cell) to each node that form the basis of the greedy algorithm (Line 10). In Lines 10 and 14, $TT(v_i,v_j,t_{v_i})$ finds the time-dependent travel-time from $v_i$ to $v_j$ (see Section 3).

Section 5—Experimental Evaluation; Section 5.1—Experimental Setup: We conducted several experiments with different spatial networks and various parameters (see FIG. 12) to evaluate the performance of TD-k NN. We ran our experiments on a workstation with 2.7 GHz Pentium Duo Processor and 12 GB RAM memory. We continuously monitored each query for 100 timestamps. For each set of experiments, we only varied one parameter and fixed the remaining to the default values in FIG. 12. With our experiments, we measured the tight cell hit ratio and the impact of k, data and query object cardinality as well as the distribution. As our dataset, we used Los Angeles (LA) and San Joaquin (SJ) road networks with 304,162 and 24,123 segments, respectively.

We evaluated our techniques using a database of actual time-dependent travel-times gathered from real-world traffic sensor data. We have collected and archived speed, occupancy, and volume sensor data from a collection of approximately 7000 sensors located on the road network of LA. The sampling rate of the data is 1 reading/sensor/min. At one time, our database consisted of about 900 million sensor readings representing traffic patterns on the road network segments of LA. In order to create the time-dependent edge weights of SJ, we developed a system (see Ugur Demiryurek and Bei Pan and Farnoush Banaei Kashani and Cyrus Shahabi; Towards modeling the traffic data on road networks; Proceedings of SIGSPATIAL-IWCTS, 2009; which is hereby incorporated by reference) that synthetically generates time-dependent edge weights for SJ.

Figure 13A:
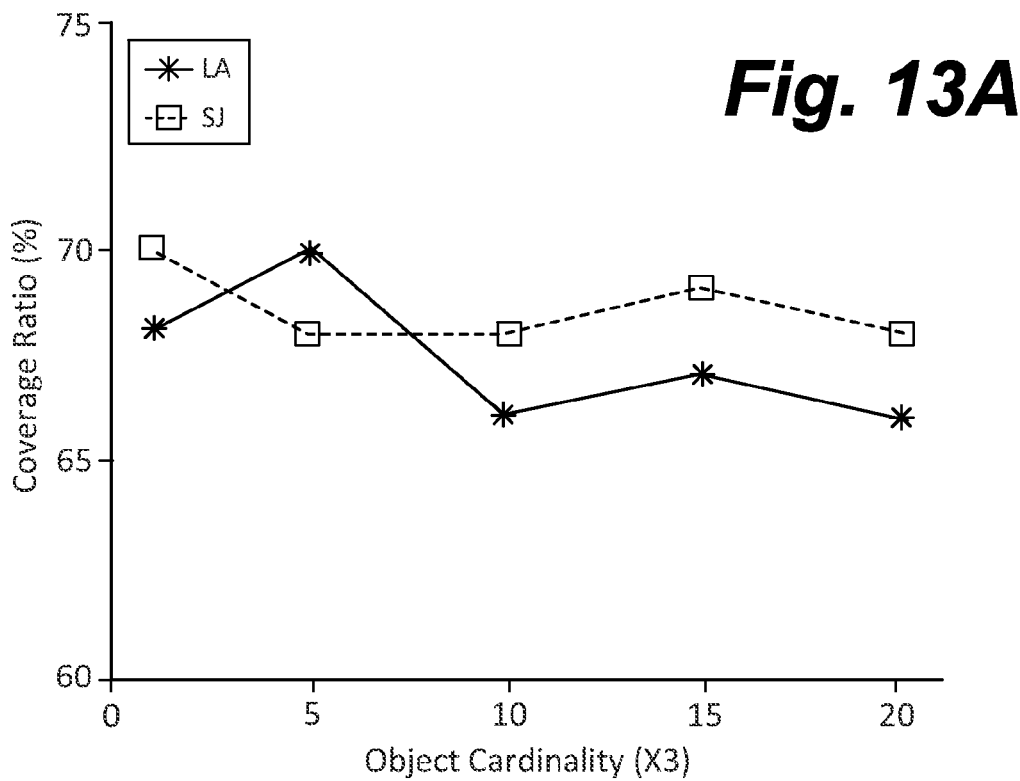
FIG. 13A depicts the coverage ratio of the tight cells.
Figure 13B:
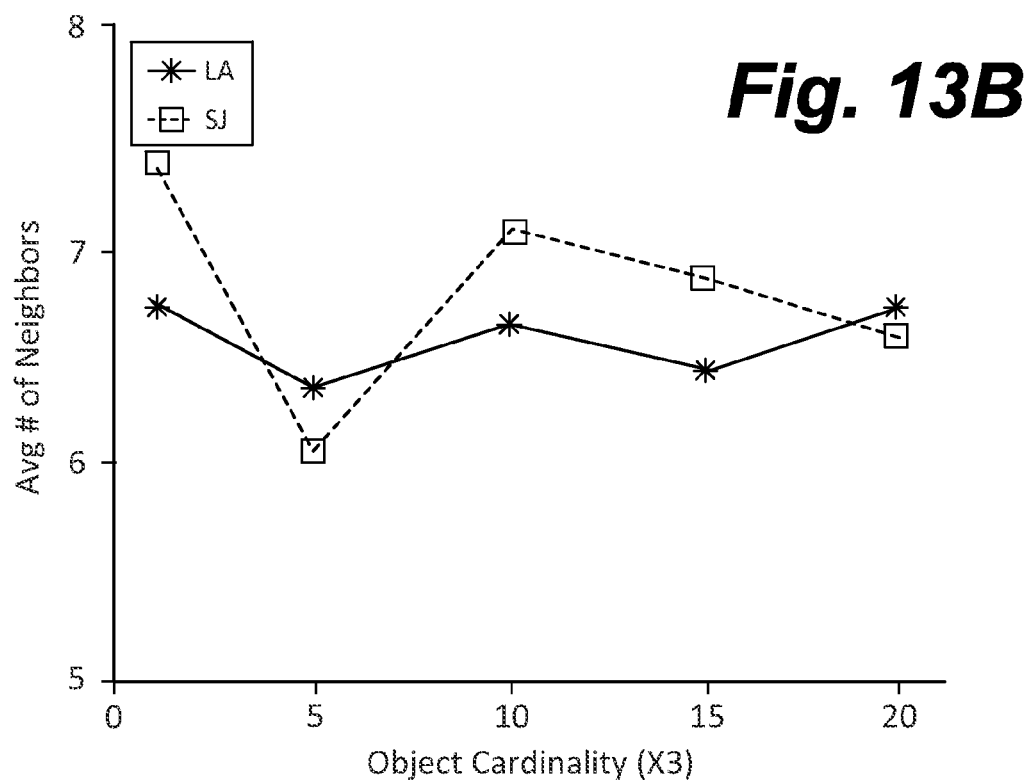
FIG. 13B depicts the average number of neighbor cells, with varying data object cardinality on two data sets.

Section 5.2—Results: Impact of Tight Cell Hit Ratio and Direct Neighbors: As explained, if a q is located in a certain tight cell $TC(p_i)$, the algorithm immediately reports $p_i$ as the first NN. Therefore, it is essential to asses the coverage area of the tight cells over the entire network. FIG. 13A illustrates the coverage ratio of the tight cells with varying data object cardinality (ranging from 1K to 20K) on two data sets. As shown, the average tight cell coverage is about 68% of the entire network for both LA and SJ. This implies that the first NN of a query can be answered immediately with a ratio of 7/10 with no further computation. Another important parameter affecting the TD-k NN algorithm is the average number of direct neighbors for each data object. FIG. 13A depicts a coverage ratio, and FIG. 13B depicts the average number of neighbor cells with varying data object cardinality. As shown, the average number of neighbors is less than 9 for both LA and SJ.

As mentioned, we developed an incremental network expansion algorithm (based on Dreyfus, P.; An appraisal of some shortest path algorithms; Journal of Operation Research 17, NY, USA, 1969) to evaluate k NN queries in time-dependent networks. Below we compare our results with this naive approach. For the rest of the experiments, since the experimental results with both LA and SJ networks differ insignificantly, we only present the results from LA dataset.

Figure 14A:
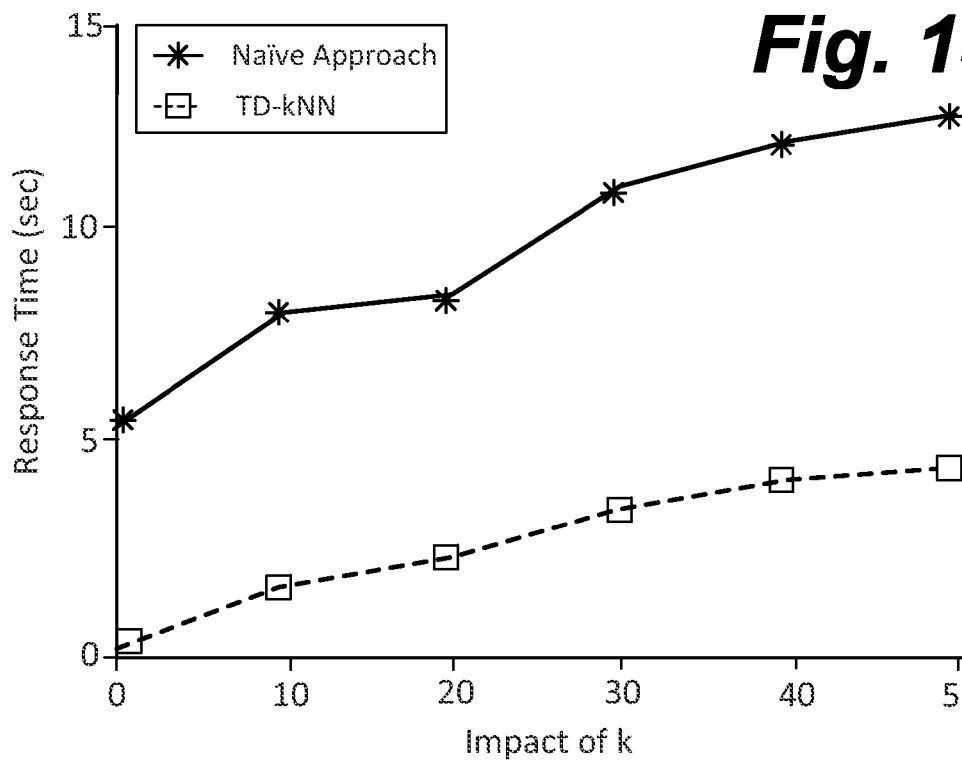
FIG. 14A depicts the average response time versus k.
Figure 14B:
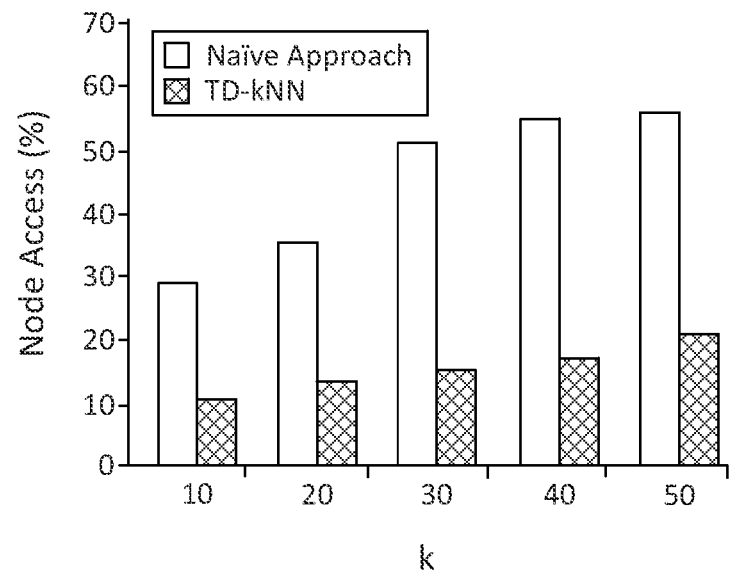
FIG. 14B depicts the number of nodes accessed, while using default settings from FIG. 12 for other parameters.
Figure 15A:
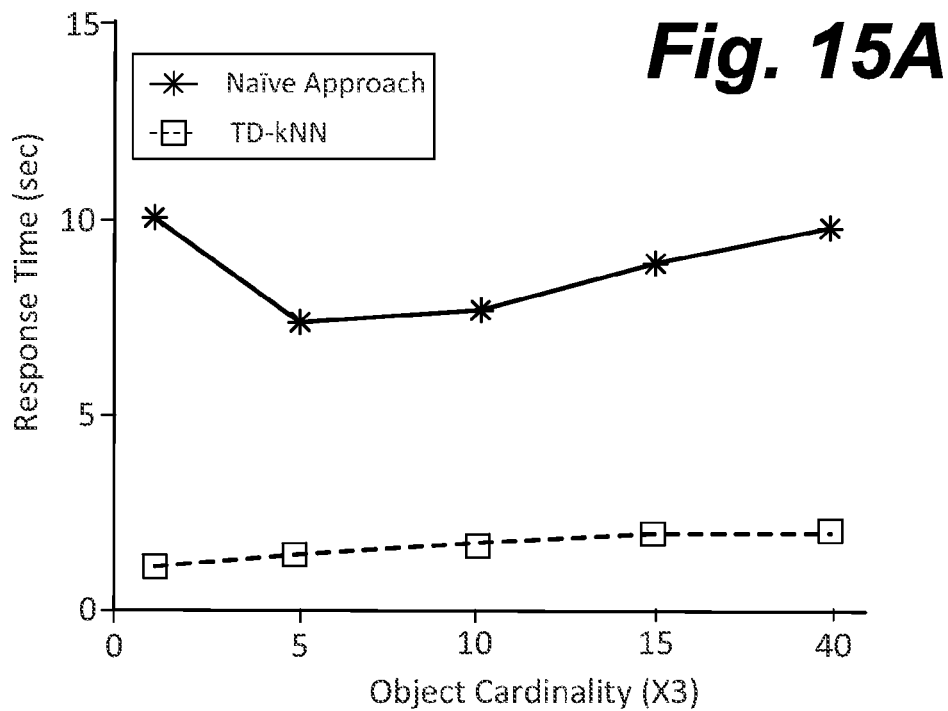
FIG. 15A shows the impact of cardinality of the data objects on response time.
Figure 15B:
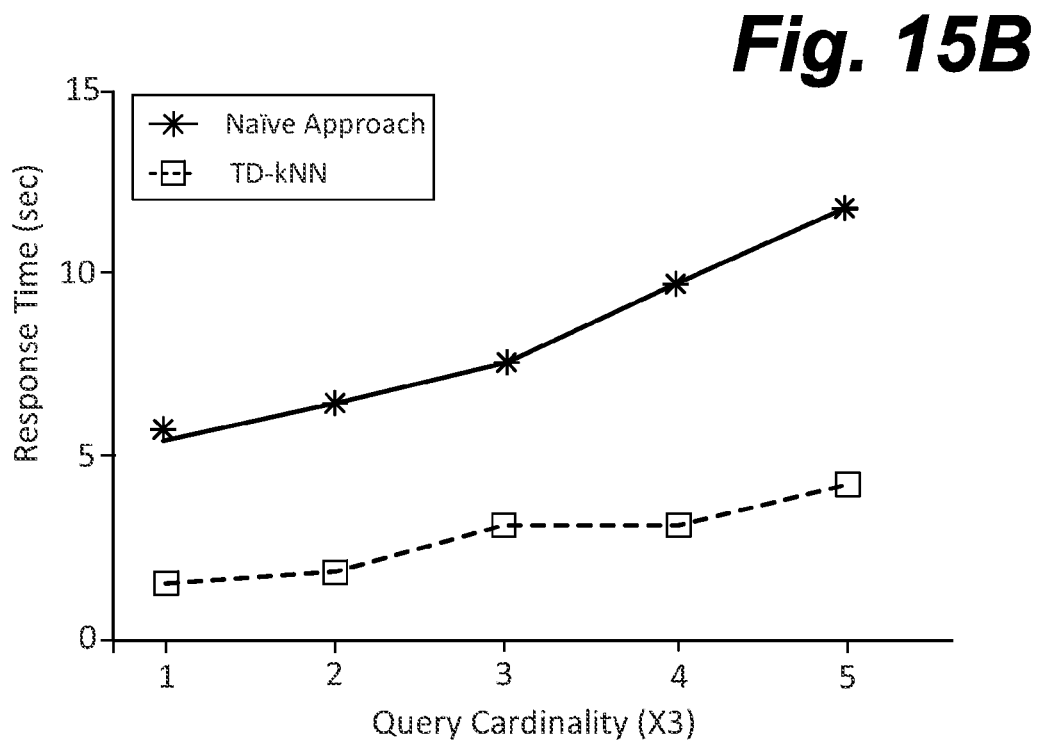
FIG. 15B shows the impact of the query cardinality on response time.

Impact of k: In this experiment, we compared the performance of both algorithms by varying the value of k. FIG. 14A plots the average response time versus k ranging from 1 to 50 while using default settings in FIG. 12 for other parameters. The results show that TD-k NN outperforms naive approach for all values of k and scales better with the large values of k. As illustrated, when k=1, TD-k NN generates the result set almost instantly. This is because a simple contain( ) function is enough to find the first NN. As the value of k increases, the response time of TD-k NN increases at linear rate. Because, TD-k NN, rather than expanding the search blindly, benefits from localized computation. In addition, we compared the average number of network node access with both algorithms. As shown in FIG. 14B, the number of nodes accessed by TD-k NN is less than the naive approach for all values of k Impact of Object and Query Cardinality: Next, we compared the algorithms with respect to cardinality of the data objects (P). FIG. 15A shows the impact of P on response time. The response time linearly increases with the number of data objects in both methods, but TD-k NN outperforms the naive approach for all cases. From P=1K to 5K, the performance gap is more significant. This is because, for lower densities where data objects are possibly distributed sparsely, the naive approach requires larger portion of the network to be retrieved. FIG. 15B shows the impact of the query cardinality (Q) ranging from 1K to 5K on response time. As shown, TD-k NN scales better with larger Q and the performance gap between the approaches increases as Q grows.

Figure 15C:
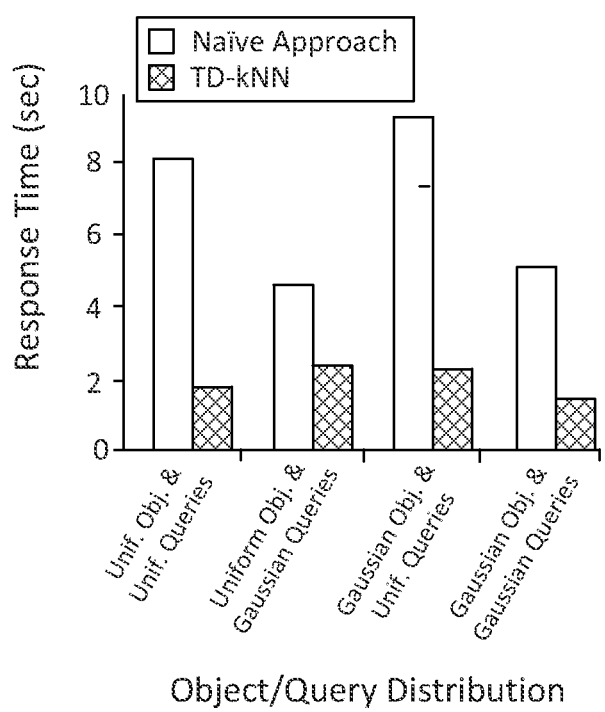
FIG. 15C shows the response time of two algorithms where the objects and queries follow either uniform or Gaussian distributions.

Impact of Object/Query Distribution: Finally, we studied the impact of object, query distribution. FIG. 15C shows the response time of both algorithms where the objects and queries follow either uniform or Gaussian distributions. TD-k NN outperforms the naive approach significantly in all cases. TD-k NN yields better performance for queries with Gaussian distribution. This is because as queries with Gaussian distribution are clustered in the network, their nearest neighbors would overlap hence allowing TD-k NN to reuse the path computations.

Section 6—Conclusion and Future Work: In this paper, we proposed a time-dependent k nearest neighbor search algorithm (TD-k NN) for spatial networks. With TD-k NN, unlike the existing studies, we make edge weights of the network time varying rather than fixed. In the real-world, time-varying edge utilization is inherit in almost all networks (e.g., transportation, internet, social networks). Hence, we believe that our approach yields a much more realistic scenario and is applicable to k NN applications in other domains. Thus, the systems and techniques described in this paper can be expanded to include new data models for effective representation of time-dependent spatial networks. This can assist in supporting development of efficient and accurate time-dependent algorithms, while minimizing the storage and cost of the computation. In addition, a variety of other spatial queries (including continuous kNN, range and skyline queries) can be explored in time-dependent networks.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e..g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method comprising:
    finding, by at least one computer system in response to a query having an associated location in a network of nodes and edges, a specified number of data objects of interest that are nearest to the location;
    wherein each of the edges has an associated time-dependent weight and the finding comprises:
    filtering out objects of a set of candidate nearest neighbors based on first sub-networks around the data objects of interest, the first sub-networks comprising a sub-network generated by expanding from a corresponding one of the data objects using a lower-bound for edge weights between nodes, wherein the expansion of the sub-network was limited by other sub-networks expanded from remaining ones of the data objects using an upper-bound for edge weights between nodes, and
    filtering in objects of the set of candidate nearest neighbors based on the first sub-networks and second sub-networks around the data objects of interest, the second sub-networks comprising a second sub-network expanded from a corresponding one of the data objects using an upper-bound for edge weights between nodes, wherein the expansion of the second sub-network was limited by other sub-networks expanded from remaining ones of the data objects using a lower-bound for edge weights between nodes.

2. The method of claim 1, wherein the network comprises a graph model of a physical road network, and the edge weights correspond to travel-times.

3. The method of claim 1, comprising partitioning the network to form the first sub-networks and the second sub-networks.

4. The method of claim 1, wherein the data objects of interest are of a first type, the network includes data objects of a second type, which is different than the first type, the query has an associated type of data object sought, and finding the specified number of the data objects comprises finding only data objects that are of the type associated with the query.

5. The method of claim 1, wherein the finding comprises:
    checking the second sub-networks for one second sub-network having the location inside it; and
    if the one second sub-network having the location inside it is found, identifying one data object corresponding to the one second sub-network as the nearest neighbor,
    else, identifying the nearest neighbor using the first sub-networks.

6. The method of claim 5, wherein the specified number is greater than one, the method comprising:
    determining a subset of the first sub-networks that are direct neighbors of a first sub-network corresponding to a last nearest neighbor identified; and
    identifying a next nearest neighbor using the subset of the first sub-networks by performing time-dependent fastest path computations that are bounded in accordance with the subset of the first sub-networks.

7. The method of claim 6, wherein identifying the nearest neighbor using the first sub-networks comprises searching a spatial index structure generated on the first sub-networks to identify candidates, and performing time-dependent fastest path computations for the candidates; wherein determining the subset of the first sub-networks comprises accessing first information stored in the spatial index structure at an entry corresponding to the last nearest neighbor identified, the first information indicating the direct neighbors; and wherein identifying the next nearest neighbor comprises using second information stored in the spatial index structure at entries corresponding to the first sub-networks of the subset, the second information indicating network nodes inside the first sub-networks of the subset by which the time-dependent fastest path computations are bounded.

8. The method of claim 7, comprising using the spatial index structure to perform data object and edge weight updates.

* * * * *